(12) United States Patent
Mitsumori et al.

(10) Patent No.: US 7,379,471 B2
(45) Date of Patent: May 27, 2008

(54) SYSTEM AND METHOD FOR GENERATING REPORTS IN A NETWORK

(75) Inventors: Derek Mitsumori, Lexington, MA (US); Kwang-Shan Pan, Acton, MA (US); Jim Flynn, Stoughton, MA (US); Harry Mussman, Bedford, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 933 days.

(21) Appl. No.: 10/629,518

(22) Filed: Jul. 29, 2003

(65) Prior Publication Data

US 2005/0025123 A1 Feb. 3, 2005

(51) Int. Cl.
*H04L 12/28* (2006.01)

(52) U.S. Cl. ...................... 370/426; 370/496

(58) Field of Classification Search ............... 370/410, 370/426, 493–496
See application file for complete search history.

(56) References Cited

U.S. PATENT DOCUMENTS

| | | | |
|---|---|---|---|
| 6,335,927 B1 * | 1/2002 | Elliott et al. | ................ 370/352 |
| 6,650,901 B1 | 11/2003 | Schuster et al. | |
| 6,675,194 B1 | 1/2004 | Pinard et al. | |
| 2002/0064149 A1 | 5/2002 | Elliott et al. | |
| 2002/0094070 A1 | 7/2002 | Mott et al. | |
| 2002/0099854 A1 | 7/2002 | Jorgensen | |
| 2003/0185232 A1 * | 10/2003 | Moore et al. | ............... 370/465 |
| 2003/0225912 A1 * | 12/2003 | Takeda et al. | .............. 709/246 |
| 2004/0003070 A1 * | 1/2004 | Fernald et al. | .............. 709/223 |
| 2004/0030766 A1 | 2/2004 | Witkowski | |
| 2004/0088404 A1 | 5/2004 | Aggarwal | |
| 2005/0232193 A1 | 10/2005 | Jorgensen | |
| 2006/0146784 A1 * | 7/2006 | Karpov et al. | .............. 370/351 |

OTHER PUBLICATIONS

International Search Authority, U.S. Patent and Trademark Office as Receiving Office, International Search Report (Form PCT/ISA/220) for international application No. PCT/US04/25032, Nov. 17, 2005, 3 pages.
European Patent Office, Supplemental European Search Report (EPO Form 1503) for European Patent Application No. 04779951.5, May 2, 2007, 3 pages.

* cited by examiner

*Primary Examiner*—Chi Pham
*Assistant Examiner*—Thai Hoang
(74) *Attorney, Agent, or Firm*—Hensley Kim & Holzer, LLC

(57) ABSTRACT

Methods and systems are described for generating reports in a communication network. More specifically, the system processes a communication at an enterprise gatekeeper; stores, in memory accessible to the enterprise gatekeeper, information associated with the communication; parses the information associated with the communication; and provides an indication of the parsed information.

34 Claims, 9 Drawing Sheets

Call Completion Statistics within Last 5 Minutes 325

| Site Name | Last Recording Time | Percentage of On-Net Calls Completed | Percentage of Off-Net Calls Completed | Percentage of Calls Not Completed | Total Calls Attempted |
|---|---|---|---|---|---|
| genuitvim-qimmilwia2 | 04/03/2003 16:00 | 0.00 | 0.00 | 0.00 | 0 |
| genuitvim-qimvistarqxia2 | 04/03/2003 16:00 | 14.29 | 85.71 | 0.00 | 7 |
| genuitvim-qimwoburn | 04/03/2003 16:00 | 2.70 | 97.30 | 0.00 | 37 |

Fig. 6

Call Completion Statistics within Last 5 Minutes — 340

| Customer/Site Name | Last Recording Time | Number of Concurrent Calls | Percentage of Maximum Allowed Calls |
|---|---|---|---|
| genuitvim-qirnmilwia2 | 04/03/2003 15:49:15 | 1 | 4.35 |
| genuitvim-qirnvistarqxia2 | 04/03/2003 15:49:15 | 13 | 14.13 |
| genuitvim-qirnwoburn | 04/03/2003 15:49:15 | 12 | 6.52 |

SYSTEM AND METHOD FOR GENERATING REPORTS IN A NETWORK

RELATED APPLICATIONS

This application is related to the following commonly owned patents and pending applications, each of which is hereby incorporated herein by reference in its entirety:

patent application Ser. No. 09/827,352, titled ALTERNATE ROUTING OF VOICE COMMUNICATIONS IN A PACKET-BASED NETWORK, filed Apr. 6, 2001;

patent application Ser. No. 10/629,517, titled SYSTEM AND METHOD FOR PROVIDING ALTERNATE ROUTING IN A NETWORK, filed concurrently herewith, and patent application Ser. No. 10/629,521, titled SYSTEM AND METHOD FOR MONITORING COMMUNICATIONS IN A NETWORK, filed concurrently herewith.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The invention disclosed herein relates generally to generating reports in a communications network. More particularly, the present invention relates to generating reports associated with packet-switched communications, such as Voice over Internet Protocol ("VoIP") calls, to provide aggregate call detail information which can be used for quality of service ("QoS") monitoring, network usage tracking, and other similar purposes.

Communications between network endpoints in packet-switched networks are generally facilitated and managed by call mediators and enterprise gatekeepers. Traditionally, a VoIP network endpoint is associated with a call mediator that is responsible for processing calls to and from the VoIP network endpoint. For example, in certain commercial applications, a call mediator is often responsible for processing calls at a particular enterprise site such as a branch office. When routing calls beyond a particular site, the call mediator generally uses H.323 signaling techniques or other protocols to communicate with an enterprise gatekeeper that is responsible for routing calls between call mediators and other network components in the enterprise.

One problem associated with this architecture is related to providing aggregate call detail information for areas of the network beyond the site associated with the call mediator such as the number of calls made between network sites, the number of calls completed, the number of calls dropped, the bandwidth utilized by these calls, etc. Often, network administrators and other users wish to obtain such information in order to perform network diagnostics, QoS testing, and other similar activities. Sites in a service provider network sometimes include gateways to the PSTN for inbound and outbound calls or multi-vendor-platform sites.

According to VoIP networks known in the art, aggregate call detail information is not readily available. Individual call mediators generally track call detail information only for the sites they manage, and this information is not shared with other network components that might, for example, seek to collect aggregate data for aspects of the network. Furthermore, companies frequently use network components made by a number of different manufacturers. These disparate components often store information in different formats and capture varying kinds of information according to manufacturer making the task of aggregating network information even more difficult.

Until now, network administrators seeking to aggregate call detail information had to rely on custom solutions built for a specific network implementation or employ only components of a single manufacturer. For example, one solution employed by network administrators managing networks comprising heterogeneous components has been to program a custom application to query individual call mediators to aggregate call detail information. One disadvantage associated with this solution is the need to program a different application for each type of network implementation. For example, the application would need to be programmed differently to obtain call detail information from Cisco components as opposed to Nortel components. This approach is inefficient and not well-suited to general implementation.

Another solution employed by network administrators is to rely on the components of a single manufacturer. For example, some VoIP component manufacturers, such as Nortel, have designed their network components to interoperate and provide certain aggregate call detail information. One major disadvantage with this solution, however, is that only the components of a given manufacturer can be used since they do not provide the desired functionality when interoperating with components from other manufacturers. This approach thus lacks flexibility desired by many network administrators and locks a customer in to one specific manufacturer's technology.

There is thus a need for systems and methods that provide improved aggregate call detail information in VoIP networks. There is also a need to provide systems and methods offering aggregate call detail information in VoIP networks comprised of heterogeneous components.

SUMMARY OF THE INVENTION

The present invention addresses, among other things, the problems discussed above generating reports in a packet-switched network.

In accordance with some aspects of the present invention, computerized methods are provided for generating reports in a packet switched network, the method comprising: processing a communication at an enterprise gatekeeper; storing, in memory accessible to the enterprise gatekeeper, information associated with the communication; parsing the information associated with the communication; and providing an indication of the parsed information. In some embodiments, the communication comprises a VoIP communication.

In some embodiments, the information associated with the communication comprises a network identifier associated with a network endpoint, an identifier associated with a geographic site such as a business establishment, signaling information such as H.323 signaling information, or a termination cause code.

In some embodiments, the information is parsed to normalize values associated with the information. In some embodiments, the information comprises values parsed from a communication header.

In some embodiments, the indication comprises generating a report containing information associated with the parsed information. For example, in some embodiments, the system generates a report containing information associated with VoIP call details.

In some embodiments, a reporting server or a log poller are also employed to generate reports. For example, in some embodiments a log poller retrieves information associated with the communication from memory accessible to the enterprise gatekeeper at regular intervals or according to a user preference. In some embodiments, the reporting server parses the information associated with the communication.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 6 presents a screen diagram of a report indicating call completion rates for several network sites according to an embodiment of the invention;

FIG. 7 presents a screen diagram of a report indicating concurrent call information according to an embodiment of the invention;

FIG. 9 presents a screen diagram of a report indicating a composite report screen according to an embodiment of the invention.

DETAILED DESCRIPTION

Figure 1:
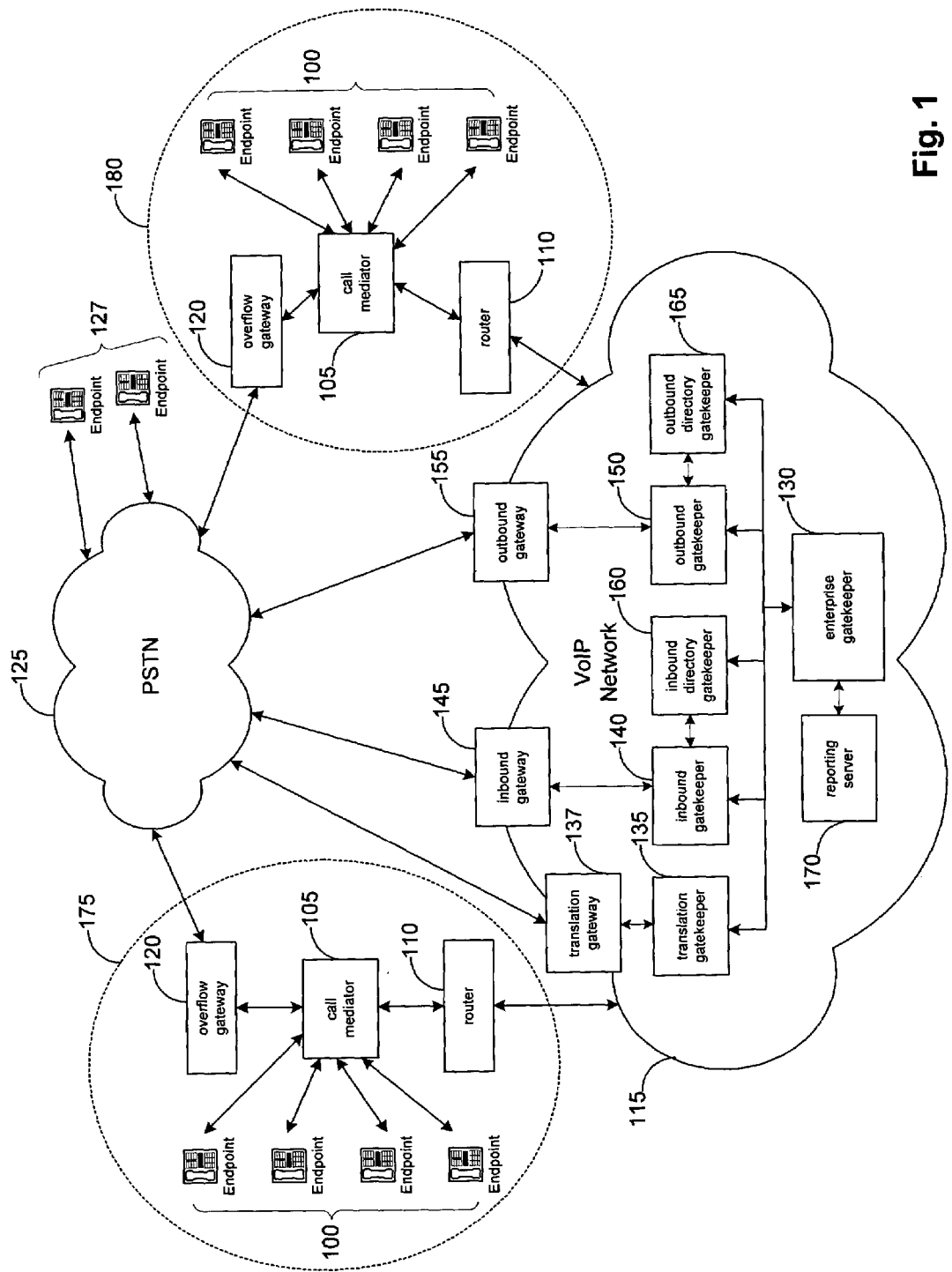
FIG. 1 presents a block diagram of an exemplary VoIP network according to one embodiment of the present invention.

With reference to FIGS. 1 through 9, embodiments of the invention are presented. FIG. 1 presents a block diagram of an exemplary VoIP network according to an embodiment of the invention. As shown, the system includes VoIP network endpoints 100, a call mediator 105, a router 110 connected to a packet-switched network such as a VoIP network 115, an overflow gateway 120 connected to a circuit-switched network 125 such as the PSTN, PSTN endpoints 127, an enterprise gatekeeper 130, a translation gatekeeper 135, a translation gateway 137, an inbound gatekeeper 140, an inbound gateway 145, an outbound gatekeeper 150, an outbound gateway 155, an inbound directory gatekeeper 160, an outbound directory gatekeeper 165, a reporting server 170, a first customer site 175, and a second customer site 180.

A VoIP network endpoint 100 is generally a network node comprising a network device suitable for conducting communications in a VoIP network, such as, a VoIP-enabled telephone handset, facsimile machine, video conferencing terminal, or other similar devices known in the art. In some embodiments, a VoIP network endpoint 100 may comprise a general-purpose computer with audio input and output capabilities suitable for conducting VoIP communications a VoIP endpoint may also be a digital phone attached to a PBX. In some embodiments, the VoIP network 115 (in terms of IP traffic) does not actually extend to reach an endpoint 100, however, the endpoint 100 is still the other end of the call. For example, the VoIP call generally terminates at the call mediator 105 (or a gateway), and the call mediator then translates the VoIP call into a digital call to the endpoint 100 or to an analog phone or analog fax machine (not shown) attached directly to the call mediator 105.

VoIP endpoints 100 generally maintain and execute client software to facilitate VoIP, as well as other types of communications. For example, according to one embodiment of the invention, VoIP endpoints 100 maintain and execute client software that adheres to the H.323 standard, which provides a foundation for audio, video, and data communications across IP-based networks 115. The H.323 standard and its related annexes, available from the H.323 Forum and at the International Telecommunication Union on the World Wide Web is hereby incorporated herein by reference in its entirety. Additionally, H.323 is an umbrella standard that describes the architecture of the conferencing system and refers to a set of other standards (H.245, H.225.0, Q.931, and others) to describe its actual protocol. Alternatively, the system may be implemented using H.323 analogous signaling techniques and other methods associated with Session Initiation Protocol ("SIP"), Media Gateway Control Protocol ("MGCP"), or other well-known protocols for transporting voice and other related data over communications networks.

Each VoIP endpoint 100 is associated with one or more identifying network addresses. For example, in some embodiments a VoIP endpoints 100 is associated with an E. 164 address as defined in the International Telecommunication Union's international public telecommunication numbering plan, available on the World Wide Web and hereby incorporated herein by reference in its entirety. Alternatively, in other embodiments, VoIP endpoints 100 are associated with IP addresses, H.323 IDs, SIP URLs, MGCP endpoint names, and other network address identifiers known in the art. In some embodiments, for example where a PBX is fronted by a VoIP gateway, endpoints may comprise digital or analog phones associated with E. 164 addresses and other network address identifiers known in the art.

Communications between VoIP endpoints 100 and other endpoints, such as PSTN endpoints 127, are handled and routed by other components within the system. For example, VoIP endpoints 100 are connected to a call mediator 105. The call mediator 105 is generally a software or hardware module, such as an IP-PBX, a PBX with a VoIP interface, a PBX fronted by a gateway, or other similar device that is generally responsible for handling intra-network communications. For example, the call mediator 105 generally handles calls between two endpoints 100 at the same enterprise site. The call mediator 105 is also generally responsible for presenting or otherwise delivering calls to other network elements in a private dialing plan ("PDP") format, in the PSTN-based format such as E.164 or prefixed-national, or other format suitable for routing through the VoIP network 115.

The call mediator 105 is connected to a circuit-switched network 125, such as the PSTN, via an overflow gateway 120. In some embodiments, such as with TDM PBX's and other PBXs, call mediators 105 and other system components may be connected directly to the PSTN without requiring an overflow gateway 120. The overflow gateway 120 routes calls directly to the PSTN 125 and to PSTN endpoints 127 and bypasses the VoIP network 115. PSTN endpoints 127 generally comprise but are not limited to traditional (non-VoIP) telephones, facsimile machines, and other similar devices known in the art. In some embodiments, PSTN endpoints 127 also comprise PBXs and IP PBXs, such as a call mediator 105 or other similar device connected to the PSTN 125 via its own overflow gateway 120. Gateways, as described herein, generally function as an entrance or an exit to another network. Gateways, for example, translate IP-based communications to PSTN-based communications, or vice-versa, and serve as a bridge between these different network types. A gateway typically has a PSTN interface connected to the PSTN 125 and an IP interface connected a VoIP network 115.

The call mediator 105 is connected to a packet-switched network 115, such as a VoIP network, via a router 110. Communications from call mediators 105 to the VoIP network 115 are passed from the router 110 to the enterprise gatekeeper 130 for further processing.

The enterprise gatekeeper 130 functions as a central management component for the system and, among other things, is generally responsible for providing communication routing and control decisions to various elements of the system such as call mediators 105, translation gatekeepers 135, inbound gatekeepers 140, inbound gateways 145, outbound gatekeepers 150, outbound gateways 155, inbound directory gatekeepers 160, outbound directory gatekeepers 165, reporting servers 170, and other devices or software modules. According to embodiments of the invention, the enterprise gatekeeper 130 also functions in conjunction with various elements of the system such as call mediators 105, translation gatekeepers 135, inbound gatekeepers 140, inbound gateways 145, outbound gatekeepers 150, outbound gateways 155, inbound directory gatekeepers 160, outbound directory gatekeepers 165, and other devices or software modules to process and route communications between network endpoints as further described in application Ser. No. 10/629,517, titled SYSTEM AND METHOD FOR PROVIDING ALTERNATE ROUTING IN A NETWORK, filed concurrently herewith, and in application Ser. No. 09/452,915, titled MULTISERVICE NETWORK, filed Dec. 1, 1999, both of which are hereby incorporated by reference in their entirety.

The enterprise gatekeeper 130 is also in communication with a reporting server 170. As further described herein, the reporting server 170 generally comprises hardware and software modules directed, among other things, to processing communication details recorded by the enterprise gatekeeper and generating indications of network usage and status based on the communication details. For example, in some embodiments, the enterprise gatekeeper 130 processes calls between endpoints in a first customer site 175, such as a branch office, and a second customer site 180, such as another branch office. The reporting server 170 processes communication details recorded by the enterprise gatekeeper 130 about these calls to generate indications and other information about the traffic between the two customer sites 175 and 180, such as the network bandwidth utilized, the total number of calls, the number of dropped calls, and other similar information.

Figure 2:
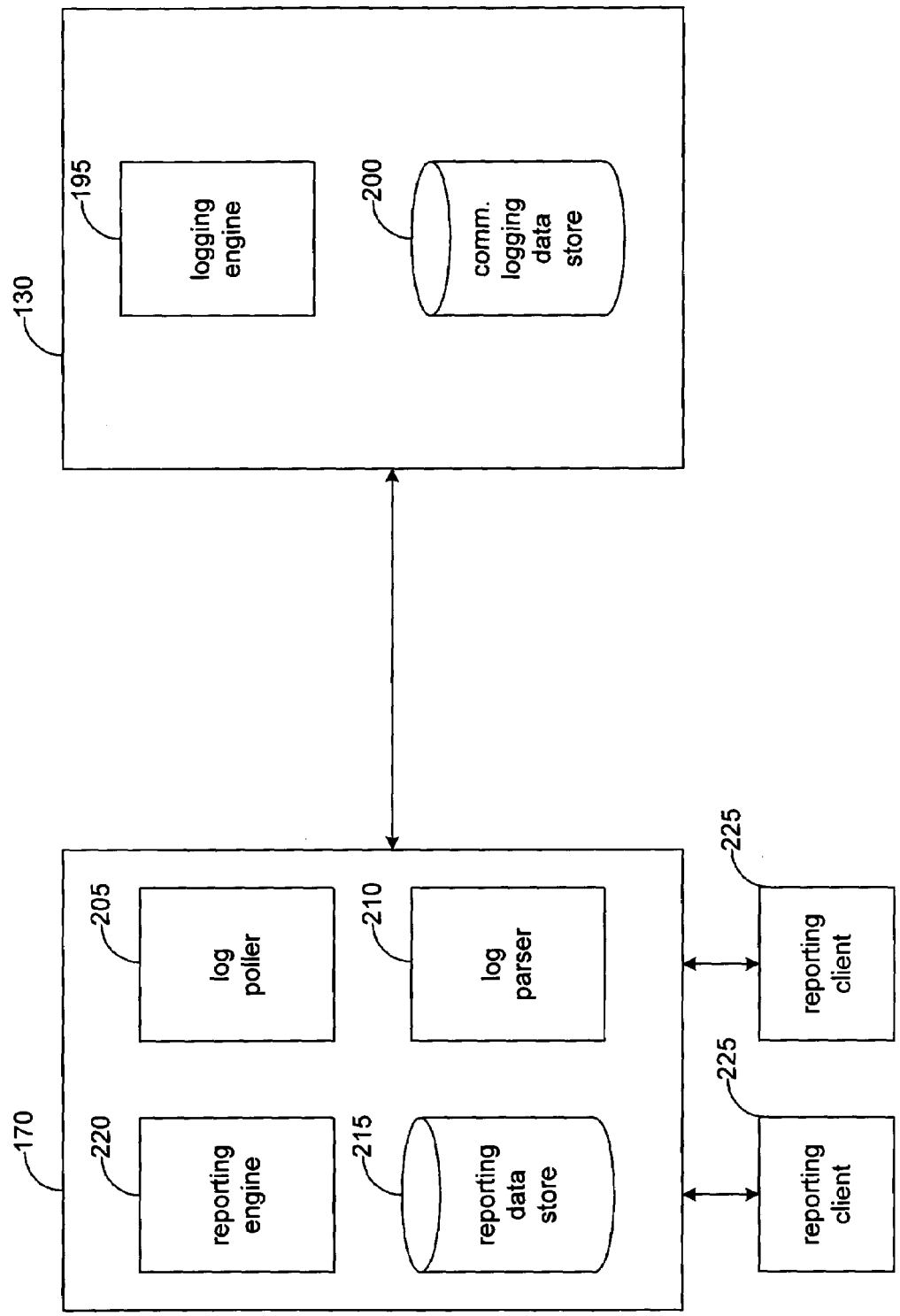
FIG. 2 presents a block diagram of components for generating a report in a VoIP network according to one embodiment of the present invention.

FIG. 2 presents a block diagram of components in an exemplary system for monitoring communications in a VoIP network according to one embodiment of the invention. The components of the present embodiment, which may comprise combinations of hardware or software components, comprise an enterprise gatekeeper 130 including a logging engine 195 and a communication logging data store 200, and a reporting server 170 including a log poller 205, a log parser 210, a reporting data store 215, and a reporting engine 220. Reporting clients 225 are operating to connect to the reporting server 170.

The enterprise gatekeeper 130 contains a logging engine 195 generally directed, among other things, to recording communication details and other information associated with communications processed by the enterprise gatekeeper 130. According to some embodiments, the logging engine 195 records communication details and information when the enterprise gatekeeper processes a H.323 registration request ("RRQ"), a registration confirm ("RCF"), a registration request ("RRJ"), an admission request ("ARQ"), an admission confirm ("ACF"), an admission reject ("ARJ"), a location request ("LRQ"), a location confirm ("LCF"), a location reject ("LRJ"), a disconnect request ("DRQ"), and other similar signaling information. The logging engine 195 also records other communication details such as information which is contained in message headers, E.G., the IP address or other network identifying address of end points, call mediators, or customer sites associated with a communication. In some embodiments, the logging engine 195 records communication details such as the duration or the amount of bandwidth used by a communication. In other embodiments, the logging engine 195 records a termination cause code or other information contained in a DRQ or other message header as further described in application Ser. No. 10/629,521 SYSTEM AND METHOD FOR MONITORING COMMUNICATIONS IN A NETWORK, filed concurrently herewith, which is hereby incorporated herein by reference in its entirety.

The enterprise gatekeeper 130 also includes a communication logging data store 200. The communication logging data 200 store generally comprises a database or other data structure stored in memory accessible to the enterprise gatekeeper 130 that contains log files comprising the communication details and information associated with the communication details captured by the logging engine 195. In some embodiments, the communication logging data store 200 contains information about communications processed by the enterprise gatekeeper 130 including call counts such as call attempts, calls dropped, calls completed, and other information. In some embodiments, the communication logging data store 200 contains unprocessed communication details and other associated information captured by the logging engine 195. For example, the logging engine 195 may capture and store the full message headers of communications processed by the enterprise gatekeeper 130 without performing any preprocessing or other manipulation of the headers to normalize the data of values they contain.

In communication with the enterprise gatekeeper 130 is a reporting server 170 that contains a log poller 205. The log poller 205 is in communication with the communication logging data store 200 and is generally responsible for retrieving log file data, such as communication details and other associated information, stored in the communication logging data store 200. In some embodiments, the log poller 205 retrieves log file data from logging data stores 200 of enterprise gatekeepers 130 and other system devices manufactured by different companies. Log file data in a heterogeneous network is thus collected and aggregated for processing as further described herein.

In some embodiments, the enterprise gatekeeper 130 sends or "pushes" information from the communication logging data store 200 to the log poller 205. In other embodiments, the log poller 205 retrieves the information from the communication logging data store 200 by making a request for or "pulling" the information. In some embodiments of the invention, information passes from the communication logging data store 200 to the log poller 205 at regular or specified intervals. In other embodiments, information passes from the communication logging data store 200 to the log poller 205 in response to a user request or preference. Alternatively, the logging engine 195 sends captured information directly to the log poller 205 and bypasses storing the information in the communication logging data store 200.

Information received by the log poller 205 is generally passed to the log parser 210 for further processing. The log parser 210 is generally responsible for processing, parsing, and otherwise normalizing the data received from the log poller 205.

Information processed by the log parser 210 is stored in a reporting data store 215. The reporting data store 215 generally comprises a database or other data structure stored in memory and accessible to the reporting server 170 that contains normalized data and other information processed by the log parser 210. In some embodiments, information, such as communication details, retrieved by the log poller 205 is first stored in the reporting data store 215, retrieved by the log parser 210 for processing, and then the results are returned to the reporting data store 215.

The reporting server 170 also contains a reporting engine 220. The reporting engine 220 is generally responsible, among other things, for retrieving information from the reporting data store 215, and processing the information retrieved to generate reports or other indications of information associated with calls in the network. For example, the reporting engine 220 may retrieve and process aggregate data associated with calls processed by the enterprise gatekeeper 130 to report or otherwise indicate, for various time periods, the number of calls completed, the number of concurrent calls handled by various customer sites, the number of dropped calls, the number of calls routed to alternate networks, the average bandwidth per call, the average hold time per call, the average call time, and other similar information.

The reporting server 170 is in communication with one or more reporting clients 225. A reporting client 225 is generally a computer terminal or software module directed to providing an interface, such as a graphical user interface ("GUI"), for a user to interact with the reporting server 170. The reporting engine 220 retrieves and processes information from the reporting data store 215 according to requests received from reporting clients 225 or from other system processes. The reports and other indications generated by the reporting engine 220 according to these requests are communicated to the reporting clients 225 as further described herein.

Figure 3:
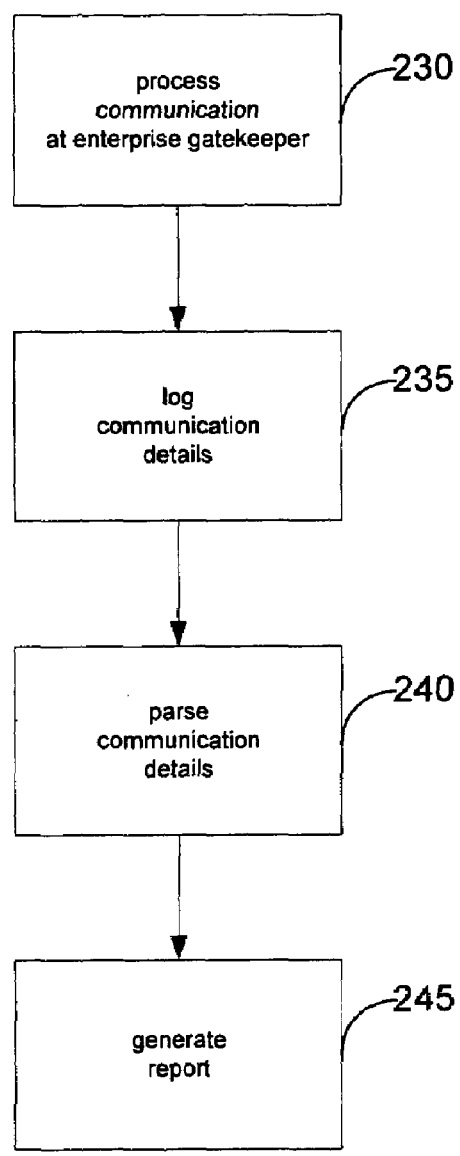
FIG. 3 presents a flow diagram of a method for generating a report in a VoIP network according to one embodiment of the present invention.

FIG. 3 presents a high-level flow diagram of a method for monitoring communications in a VoIP network according to one embodiment of the invention. A communication, such as a VoIP communication, is processed at an enterprise gatekeeper, step 230. In some embodiments, a communication includes an H.323 signaling request or other signaling communication between an enterprise gatekeeper and a component in a VoIP network.

The enterprise gatekeeper captures and logs communication details and other associated information processed by the enterprise gatekeeper, step 235. In some embodiments, the enterprise gatekeeper captures raw or unprocessed information such as message headers, H.323 signaling requests, and other similar information. In other embodiments, the enterprise gatekeeper captures and extracts only specified communication details from the communications it processes, such as call counts, network addresses, call times, payload information, and other similar information.

The communication details are parsed, step 240. In some embodiments, the communications details are parsed to provide normalized values. In other embodiments, the communication details are parsed to include only a subset of the communication details. The system generates an indication, such as a report, from the parsed details according to a user request or other request received, such as a request from a system process, step 245.

Figure 4:
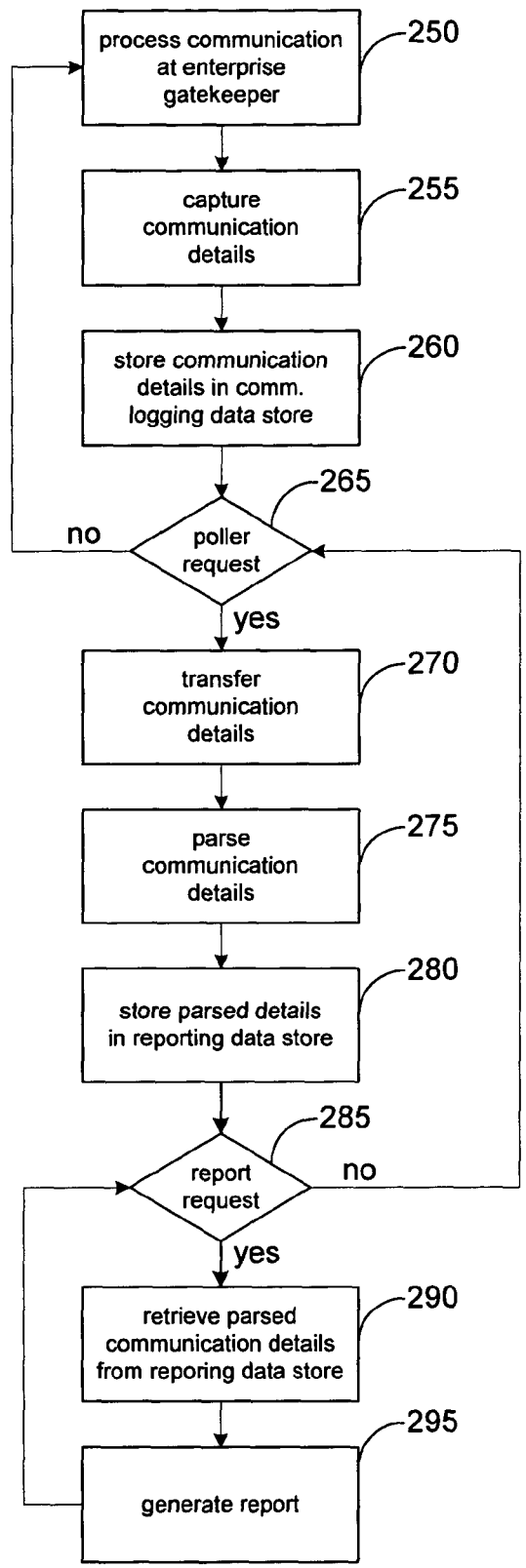
FIG. 4 present a flow diagram of a method for generating a report according to one embodiment of the present invention.

FIG. 4 present a more detailed flow diagram of a method for generating a report according to one embodiment of the invention. A communication is processed by an enterprise gatekeeper, step 250. For example, the enterprise gatekeeper may process an ARQ, transmit an ARJ, setup an VoIP communication, route a communication to an alternate network, perform a check for network resources according to a communication, process an LRQ, or perform other similar functions.

The system captures the communication details or other information associated with the communication at the enterprise gatekeeper, step 255. In some embodiments, the communications details are captured by a logging engine associated with the enterprise gatekeeper. For example, the system may capture a message header associated with a communication, or the system may add to a call count stored in a communication logging data store or other data store indicating a call attempt, an ARQ received, or other count.

The communication details or other associated information captured at the enterprise gatekeeper are stored in a communication logging data store, step 260. Table A below provides a set of exemplary communication details recorded in the communication logging data store according to an embodiment of the invention. For example, as shown, the system records the average bandwidth per call, the total bandwidth used by all calls, as well as the total number of ACF's, ARJ's, and LRQ's. This information is later used, among other things, to generate reports and provide other system indicia as further described herein.

TABLE A

| Item Label | Details Recorded | Brief Description |
|---|---|---|
| AVERAGE BANDWIDTH | Average bandwidth per call | Calculates the average bandwidth used per completed call. |
| TOTAL BANDWIDTH | TotalBandwidth | Measures aggregate bandwidth utilized on the converged conduit. |
| TOTAL_ACF | acf(n) | Counts the number of confirmations returned in response to ARQ's. |
| TOTAL_ARJ | arj(n) | Counts the number of rejects returned in response to ARQ's. |
| TOTAL_LRQ | lrq(n) | Counts the number of times a local endpoint was not located on the gatekeeper, prompting a location request made to a remote gatekeeper. |

The system continues processing communications at the enterprise gatekeeper and recording communication details until a request is received from a log poller associated with a reporting server, step 265. If a request is received from the log poller, the system transfers the communication details from the communication logging data store to the log poller, step 270.

The log poller generally issues requests at regular intervals. For example, in some embodiments, the log poller requests data associated with concurrent connections every 30 minutes and data associated with signaling requests, such as H.323 signaling requests, every 5 minutes. As previously described herein, in some alternate embodiments, the system "pushes" communication details to the log poller at specified intervals or according to user input or as directed by another system process.

The communication details and other associated information from the communication logging data store is parsed, step 275, and stored in the reporting data store, step 280. As previously described herein, in some alternate embodiments, the communication details and other associated information from the communication logging data store is first stored in the reporting data store and then parsed. According to embodiments of the invention, parsing includes performing lexical analysis, semantic parsing, subdividing, processing, normalizing, or otherwise manipulating data retrieved from the communication logging data store.

In some embodiments, the communication details and other associated information is parsed by a log parser. For example, in some embodiments, the logging engine captures raw header information from call mediators or other system components. A header generated by one manufacturer's gatekeeper or call mediator may be formatted somewhat differently than that generated by another manufacturer. Additionally, in some embodiments, it may only be desirable to store certain information extracted from the headers and discard other information. For example, the time of a communication or call count of a signaling request or type of device might be of interest, but the actual IP address of a translation gateway processing the communication might not be relevant.

The system continues processing communications, storing communication details, retrieving communication details, and parsing the communication details until a report request is received, step 285. A report request may be issued by a user at a reporting client or by a system process or other software application according to embodiments of the invention. Report requests generally include information specifying the type of data to be displayed in the report or otherwise calculated, as well as a time period the report should cover. For example, a report request might request information such as the total number of dropped calls in the previous 10 minutes, the total bandwidth used by a particular enterprise site on a given day of the week sorted by device type or network node, aggregate call detail information for a week, and other similar types of information. Exemplary reports according to embodiments of the invention are shown in FIGS. 5-10.

The information required to generate the report or other indicia are retrieved from the reporting data store, step 290, and processed to generate the requested report, step 295. In some embodiments, a reporting engine retrieves the information from the reporting data store and processes the retrieved information to generate the report. For example, by retrieving and calculating the number of LRQ's recorded in a given time period (indicating the number of times a remote host lookup/locate was performed for an off-net communication), the system produces a report to indicate the number of off-net calls made during that time period. Table B below provides a set of exemplary report items and calculations that can be performed according to data stored in the reporting data store:

TABLE B

| Item Label | Calculation and Details Recorded to Calculate | Brief Description |
| --- | --- | --- |
| NUMBER OF CALLS | TotalBandwidth Used/average bandwidth per call | The NUMBER OF CALLS can also be used to characterize the customer's calling patterns. Any unusual departure from past calling patterns may indicate a problem. |
| PERCENT UTILIZATION | AllocTotalBandwidth/TotalBandwidth | While all efforts are made to size the capacity of the converged conduits appropriately, PERCENT UTILIZATION measures utilization of the available bandwidth on the converged conduit. If the percent utilization is consistently high, scaling options should possibly be reviewed with the customer. |
| NEW_ACF | acf(n) − acf(n−1) | Counts the number of confirmations returned in response to ARQ's within the specified time interval. |
| NEW_ARJ | arj(n) − arj(n−1) | Counts the number of rejects returned in response to ARQ's within the specified time interval. |
| NEW_LRQ | lrq(n) − lrq(n−1) | Counts the number of times, within the specified time interval, a local endpoint was not located on the gatekeeper, prompting a location request made to a remote gatekeeper. |
| NEW_ONNET | (acf(n) − lrq(n)) − (acf(n−1) − lrq(n−1)) | NEW_ONNET counts the number of calls successfully handled by the Enterprise Gatekeeper for termination subtracted by the number of calls the Enterprise Gatekeeper has handed off to its remote overflow zone (and remote gatekeeper) for off-net termination. |
| NEW_TOTALCALLS | (acf(n) + arj(n)) − (acf(n−1) + arj(n−1)) | NEW_TOTALCALLS counts the number of total calls (including those on-net and those handled by the remote overflow zone) successfully handled by the Enterprise Gatekeeper for termination and those rejected by the Enterprise Gatekeeper. This number |

TABLE B-continued

| Item Label | Calculation and Details Recorded to Calculate | Brief Description |
|---|---|---|
| PERCENT_ONNET | NEW_ONNET/ NEW_TOTALCALLS | corresponds to the total number of ARQs presented to the Enterprise Gatekeeper. PERCENT_ONNET characterizes the percent of new calls that are on-net. This value can help better capture call patterns for the customer. |
| PERCENT_OFFNET | NEW_LRQ/ NEW_TOTALCALLS | PERCENT_OFFNET characterizes the percent of new calls that are offnet, as indicated by their LRQs to the remote off-net zones. This value can help better capture off-net call patterns for the customer. |
| PERCENT_REJECT | NEW_ARJ/ NEW_TOTALCALLS | PERCENT_REJECT characterizes the percent of new calls that the Enterprise Gatekeeper has rejected back to the enterprise site. A baseline value characteristic of the enterprise's call patterns can be developed after some amount of time of normal calling. Once this baseline is established, and unusually high PERCENT_REJECT can be used to identify potential problems. |

Figure 5:
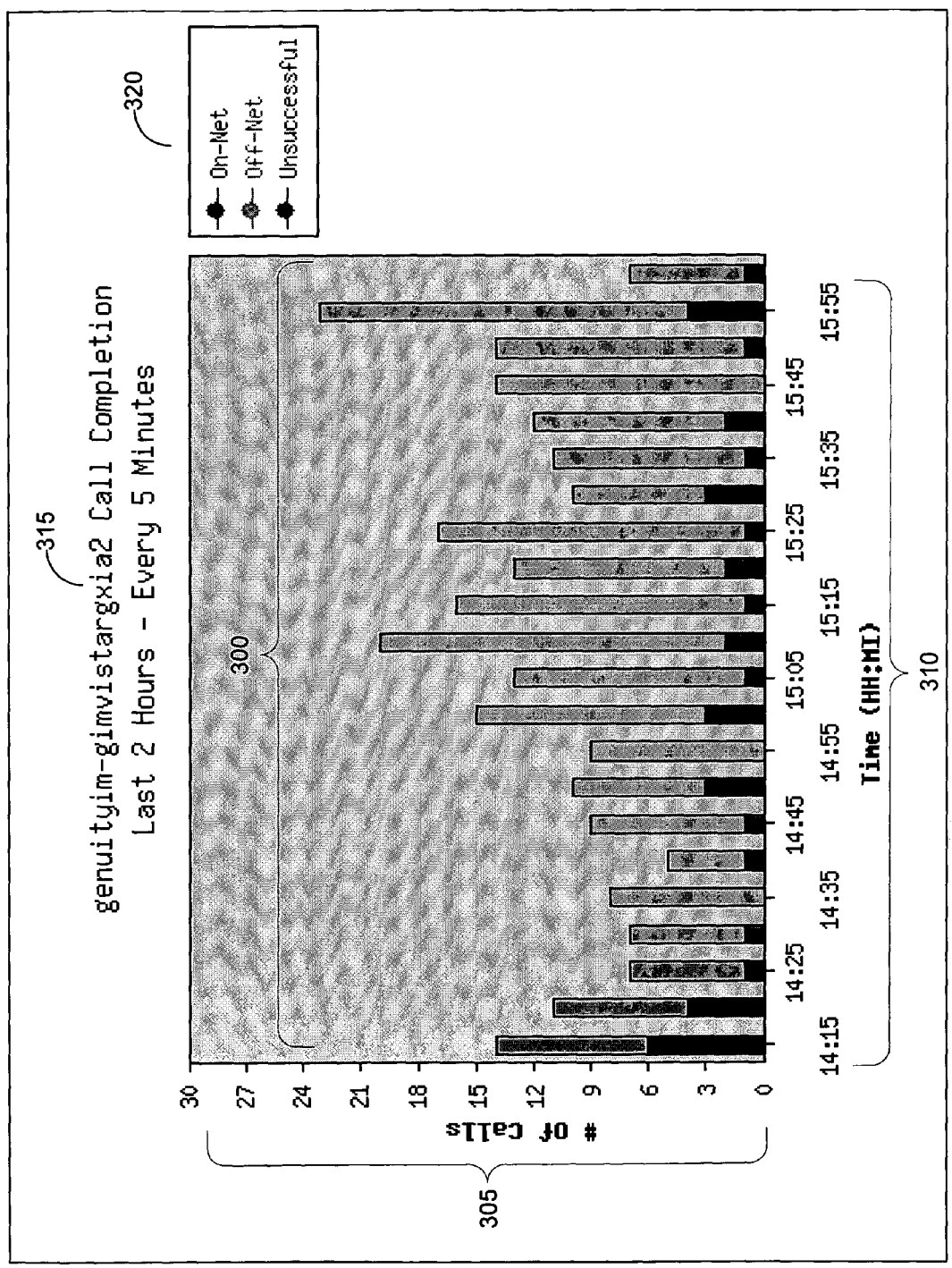
FIG. 5 presents a screen diagram of a report indicating the number of on-net, off-net, and unsuccessful communications processed in a given interval according to an embodiment of the invention.

FIG. 5 presents a report screen indicating the number of on-net, off-net, and unsuccessful communications processed in a given interval according to one embodiment of the present invention. As shown, the report screen contains a bar graph representation 300 of the number of calls conducted. The bar graph 300 is plotted on an x-y axis with the vertical axis 305 indicating the number of calls and the horizontal axis 310 indicating time intervals. The report screen also depicts a title 315 identifying the enterprise sites that are subject of the report, as well as the information being conveyed in the report. A legend 320 is also included providing a visual explanation to discriminate between on-net, off-net, and unsuccessful calls as shown in the bar graph 300.

FIG. 6 presents a report screen indicating call completion rates for several network sites according to one embodiment of the present invention. The report screen includes columns 325 indicating the call detail information being reported such as the site name, the last recording time, the percentage of on-net calls completed, the percentage of off-net calls completed, the percentage of calls not completed, and the total call attempts for each site. The report screen also includes rows 330 identifying particular sites for which the call details are being reported, as well as the values reported. A title or other header identifies the information being conveyed and the time period from which the information was derived.

FIG. 7 presents a report screen illustrating an exemplary tabular report screen indicating concurrent call information associated with a number of network sites according to one embodiment of the present invention. The report screen includes columns 340 indicating call detail information being reported such as the customer/site name, the last recording time, the number of concurrent calls for the site, and the percentage of maximum allowed calls for the site. The report screen also includes rows 345 identifying particular sites for which the call details are being reported, as well as the values reported. A title 350 identifies the information being conveyed by the report.

Figure 8:
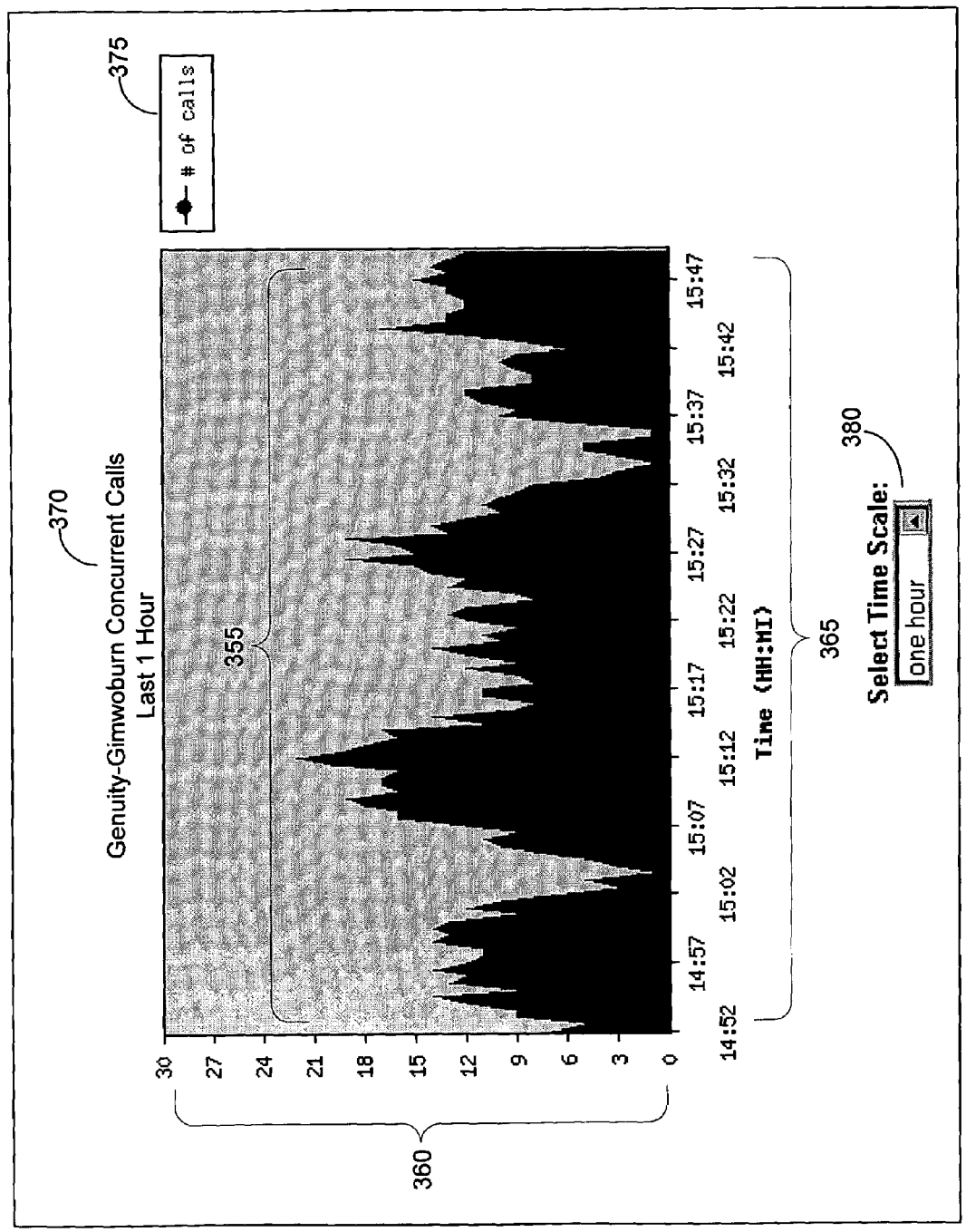
FIG. 8 presents a screen diagram of a report indicating concurrent call rates in a given time period according to an embodiment of the invention.

FIG. 8 presents a report screen illustrating an area graph 355 indicating concurrent call rates in a given time period according to one embodiment of the present invention. The area graph 355 is plotted on an x-y axis with the vertical axis 360 indicating the number of calls and the horizontal axis 365 indicating time intervals. The report screen also depicts a title 370 identifying the enterprise sites that are subject of the report, as well as the information being conveyed in the report. A legend 375 is also included providing a visual key to information represented in the area graph 355. The report screen also includes a selection interface 380 directed to modifying the time interval for the report. For example, in some embodiments, the selection interface 380 comprises a drop down menu which permits users to select time intervals and automatically update the report according to 1 hour, 6 hour, 12 hour, 24 hour, 1 week, and other time intervals.

Figure 9:
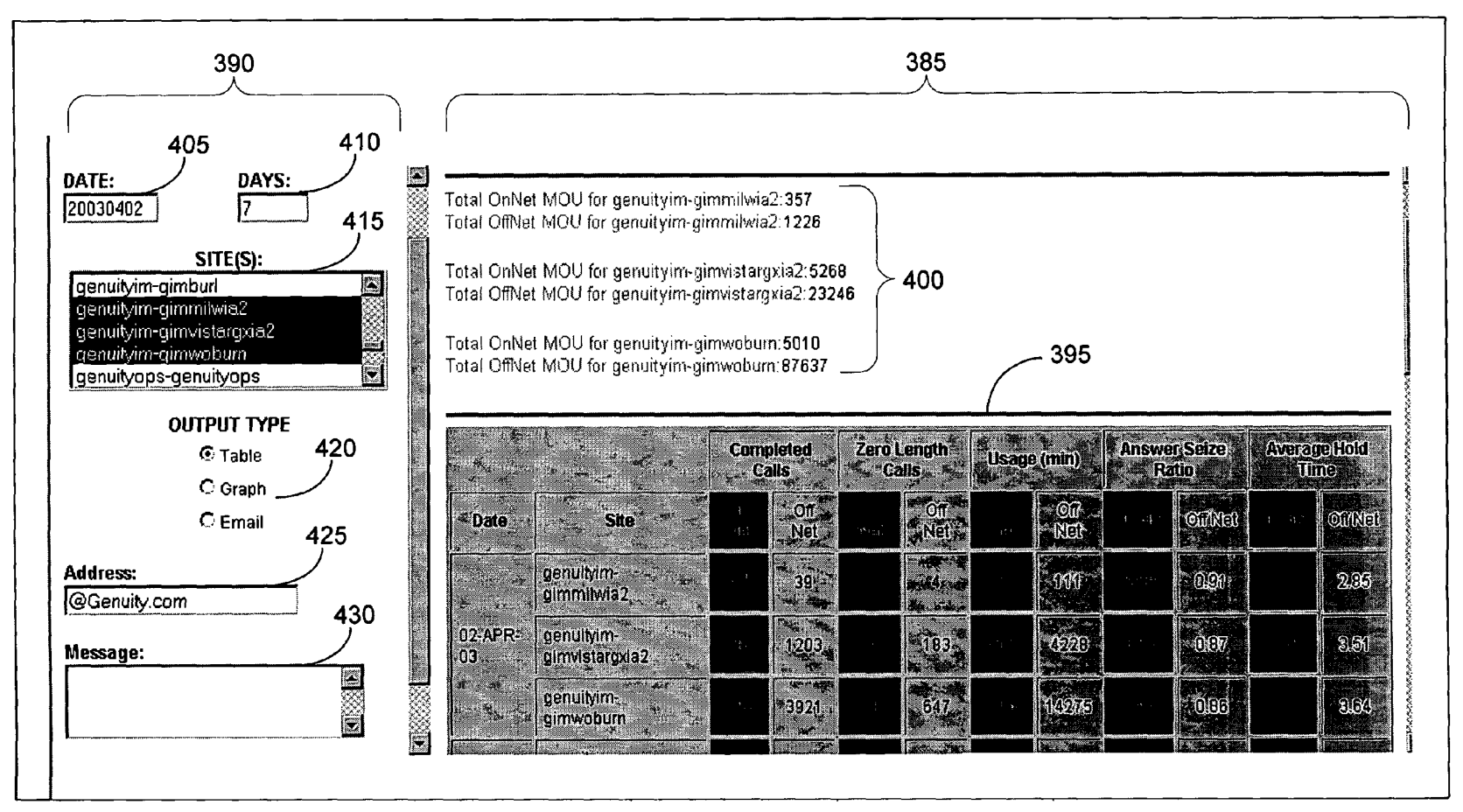

FIG. 9 presents a report screen illustrating a composite report screen that includes a report information section 385 and a report interface section 390 according to one embodiment of the present invention. The report information section 385 contains a tabular report 385 indicating call detail information for a number of network sites on a given date including completed calls, zero length calls, minutes of usage, answer seize ratios, and average hold times. The report information section 385 also includes a summary section 400 indicating aggregate call detail information for a number network sites.

The report interface section 390 is directed, among other things, to providing an interface through which users can update report criteria and generate new reports or other indicia. As shown, the report interface includes a date selection interface 405, a number of days (of data to report) selection interface 410, a site(s) (from which data will be reported) selection interface 415, an output type selection interface 420, an output destination (such as an e-mail address) input field 415, and a message or comments input field 430. When a selection interface or other element of the report interface section 390 changes the criteria against which the report is generated, the report section 385 updates the information displayed to reflect the change.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the embodiments of the invention have been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computerized method for generating reports in a packet switched network, the method comprising:
    processing a communication at a first enterprise gatekeeper;
    storing, in memory accessible to the first enterprise gatekeeper, information associated with the communication;
    wherein storing information associated with the communication comprises storing an identifier associated with a geographic site, and
    wherein storing an identifier associated with a geographic site comprises storing an identifier associated with a business establishment;
    parsing the information associated with the communication; and
    providing an indication of the parsed information.

2. The method of claim 1, wherein processing a communication comprises processing a VoIP communication.

3. The method of claim 1, wherein storing information associated with the communication comprises storing a network identifier associated with a network endpoint.

4. The method of claim 1, wherein storing information associated with the communication comprises storing signaling information.

5. The method of claim 4, wherein storing signaling information comprises storing H.323 signaling information.

6. The method of claim 1, wherein storing information associated with the communication comprises storing a termination cause code.

7. The method of claim 1, wherein parsing the information comprises normalizing values associated with the information.

8. The method of claim 1, wherein parsing comprises parsing values from a communication header.

9. The method of claim 1, wherein providing an indication comprises generating a report containing information associated with the parsed information.

10. The method of claim 9, wherein generating a report comprises generating a report containing information associated with VoIP call details.

11. The method of claim 1, further comprising retrieving the information associated with the communication from memory accessible to the enterprise gatekeeper using a log poller.

12. The method of claim 11, wherein retrieving the information comprises retrieving at regular intervals.

13. The method of claim 11, wherein retrieving the information comprises retrieving according to a user preference.

14. The method of claim 1, further comprising processing at least as a second communication at a second enterprise gatekeeper;
    storing, in memory accessible to the second enterprise gatekeeper, information associated with the second communication;
    parsing the information associated with the second communication;
    and providing an indication of the parsed information.

15. The method of claim 14, wherein the second enterprise gatekeeper is manufactured by a different company than the first enterprise gatekeeper.

16. The method of claim 14, further comprising retrieving the information associated with the first communication and the second communication using a log poller.

17. The method of claim 14, wherein providing an indication of the parsed information comprises providing an indication of the information associated with the first communication and the information associated with the second communication.

18. A computerized system for generating reports in a packet switched network, the system comprising:
    a first enterprise gatekeeper communicatively coupled to a reporting server;
    wherein the first enterprise gatekeeper is programmed to process a communication at the first enterprise gatekeeper and store, in memory accessible to the first enterprise gatekeeper, information associated with the communication;
    wherein the information associated with the communication comprises an identifier associated with a geographic site and a business establishment; and
    wherein the reporting server is programmed to parse the information associated with the communication and provide an indication of the parsed information.

19. The system of claim 18, wherein the communication comprises a VoIP communication.

20. The system of claim 18, wherein the information associated with the communication comprises a network identifier associated with a network endpoint.

21. The system of claim 18, wherein the information associated with the communication comprises signaling information.

22. The system of claim 21, wherein the signaling information comprises H.323 signaling information.

23. The system of claim 18, wherein the information associated with the communication comprises a termination cause code.

24. The system of claim 18, wherein the reporting server parses the information to normalize values associated with the information.

25. The system of claim 18, wherein the reporting server parses values from a communication header.

26. The system of claim 18, wherein the indication comprises a report containing information associated with the parsed information.

27. The system of claim 26, wherein the report contains information associated with VoIP call details.

28. The system of claim 18, comprising a log poller programmed to retrieve the information associated with the communication from memory accessible to the enterprise gatekeeper.

29. The system of claim 28, wherein the log poller retrieves the information at regular intervals.

30. The system of claim 28, wherein the log poller retrieves the information according to a user preference.

31. The system of claim 18, further comprising at least a second enterprise gatekeeper communicatively coupled to the reporting server;
   wherein the second enterprise gatekeeper is programmed to process at least a second communication at the second enterprise gatekeeper and store, in memory accessible to the second enterprise gatekeeper, information associated with the second communication; and
   wherein the reporting server is programmed to parse the information associated with the second communication and provide an indication of the parsed information.

32. The system of claim 31, wherein the second enterprise gatekeeper is manufactured by a different company than the first enterprise gatekeeper.

33. The system of claim 32, further comprising a log poller programmed to retrieve the information associated with the first communication and the second communication.

34. The system of claim 31, wherein the reporting server is programmed to parse the information associated with the first communication and the second communication and provide an indication of the parsed information.

* * * * *